(12) United States Patent
Delaney et al.

(10) Patent No.: US 7,085,910 B2
(45) Date of Patent: Aug. 1, 2006

(54) MEMORY WINDOW MANAGER FOR CONTROL STRUCTURE ACCESS

(75) Inventors: William Delaney, Wichita, KS (US); William Hetrick, Wichita, KS (US); Charles Nichols, Wichita, KS (US)

(73) Assignee: LSI Logic Corporation, Milpitas, CA (US)

( * ) Notice: Subject to any disclaimer, the term of this patent is extended or adjusted under 35 U.S.C. 154(b) by 329 days.

(21) Appl. No.: 10/648,967

(22) Filed: Aug. 27, 2003

(65) Prior Publication Data

US 2005/0050290 A1    Mar. 3, 2005

(51) Int. Cl.
*G06F 12/00* (2006.01)
(52) U.S. Cl. ...................................... 711/202
(58) Field of Classification Search ................ 711/202, 711/170
See application file for complete search history.

(56) References Cited

U.S. PATENT DOCUMENTS

| | | | |
|---|---|---|---|
| 5,530,840 A | 6/1996 | Lee et al. | |
| 5,579,452 A | 11/1996 | Ambalavanar et al. | |
| 5,606,428 A | 2/1997 | Hanselman | |
| 5,625,557 A | 4/1997 | Colosky | |
| 5,754,817 A * | 5/1998 | Wells et al. | 711/203 |
| 5,860,157 A * | 1/1999 | Cobb | 711/103 |
| 6,104,417 A | 8/2000 | Nielsen et al. | |
| 6,105,040 A | 8/2000 | Agesen | 707/206 |
| 6,314,501 B1 * | 11/2001 | Gulick et al. | 711/153 |
| 6,587,934 B1 | 7/2003 | Miura et al. | 711/154 |
| 6,792,515 B1 * | 9/2004 | Smith | 711/153 |

\* cited by examiner

*Primary Examiner*—Hiep T. Nguyen
(74) *Attorney, Agent, or Firm*—Ortiz & Lopez, PLLC

(57) ABSTRACT

Methods and systems for managing control structure access by a processor are disclosed. In general, a processor can communicate with a plurality of control structures. A memory window manager can then be implemented, which communicates with said processor and said plurality of control structures. The memory window manager specifies which control structure among said plurality of control structures is accessible by said processor. The memory window manager also specifies which control structure can be mapped into an address space of said processor.

13 Claims, 3 Drawing Sheets

MEMORY WINDOW MANAGER FOR CONTROL STRUCTURE ACCESS

TECHNICAL FIELD

Embodiments are related to data-processing methods and systems. Embodiments are also related to processors and control structures. Embodiments are additionally related to memory allocation and memory conservation techniques utilized in data-processing systems or devices, such as computers.

BACKGROUND OF THE INVENTION

It is often necessary to utilize extremely large amounts of memory for storing fixed-size "control structures" required by software applications. In fact, the amount of memory utilized for such structures can exceed the actual memory addressing capabilities of the processor or an associated application program. Many data-processing environments require a small-to-moderate amount of memory. When considered in total, however, the aggregate amount of memory for these structures may be extremely large. This presents a problem in cases where the processor address space is smaller than the aggregate amount of memory needed for control structure access.

BRIEF SUMMARY

The following summary of the invention is provided to facilitate an understanding of some of the innovative features unique to the present invention and is not intended to be a full description. A full appreciation of the various aspects of the invention can be gained by taking the entire specification, claims, drawings and abstract as a whole.

It is therefore one aspect of the present invention to provide improved data-processing methods and systems It is another aspect of the present invention to provide improved processor and control structures.

It is yet another aspect of the present invention to provide memory allocation and memory conservation techniques utilized in data-processing systems or devices, such as computers.

The above and other aspects of the invention can be achieved as will now be briefly described. Methods and systems for managing control structure access by a processor are disclosed herein. In general, a processor can communicate with a plurality of control structures. A memory window manager can then be implemented, which communicates with said processor and said plurality of control structures. The memory window manager specifies which control structure among said plurality of control structures is accessible by said processor. The memory window manager also specifies which control structure can be mapped into an address space of said processor.

BRIEF DESCRIPTION OF THE DRAWINGS

The accompanying figures, in which like reference numerals refer to identical or functionally-similar elements throughout the separate views and which are incorporated in and form part of the specification further illustrate embodiments of the present invention.

DETAILED DESCRIPTION OF THE INVENTION

The particular values and configurations discussed in these non-limiting examples can be varied and are cited merely to illustrate embodiments of the present invention and are not intended to limit the scope of the invention.

Figure 1:
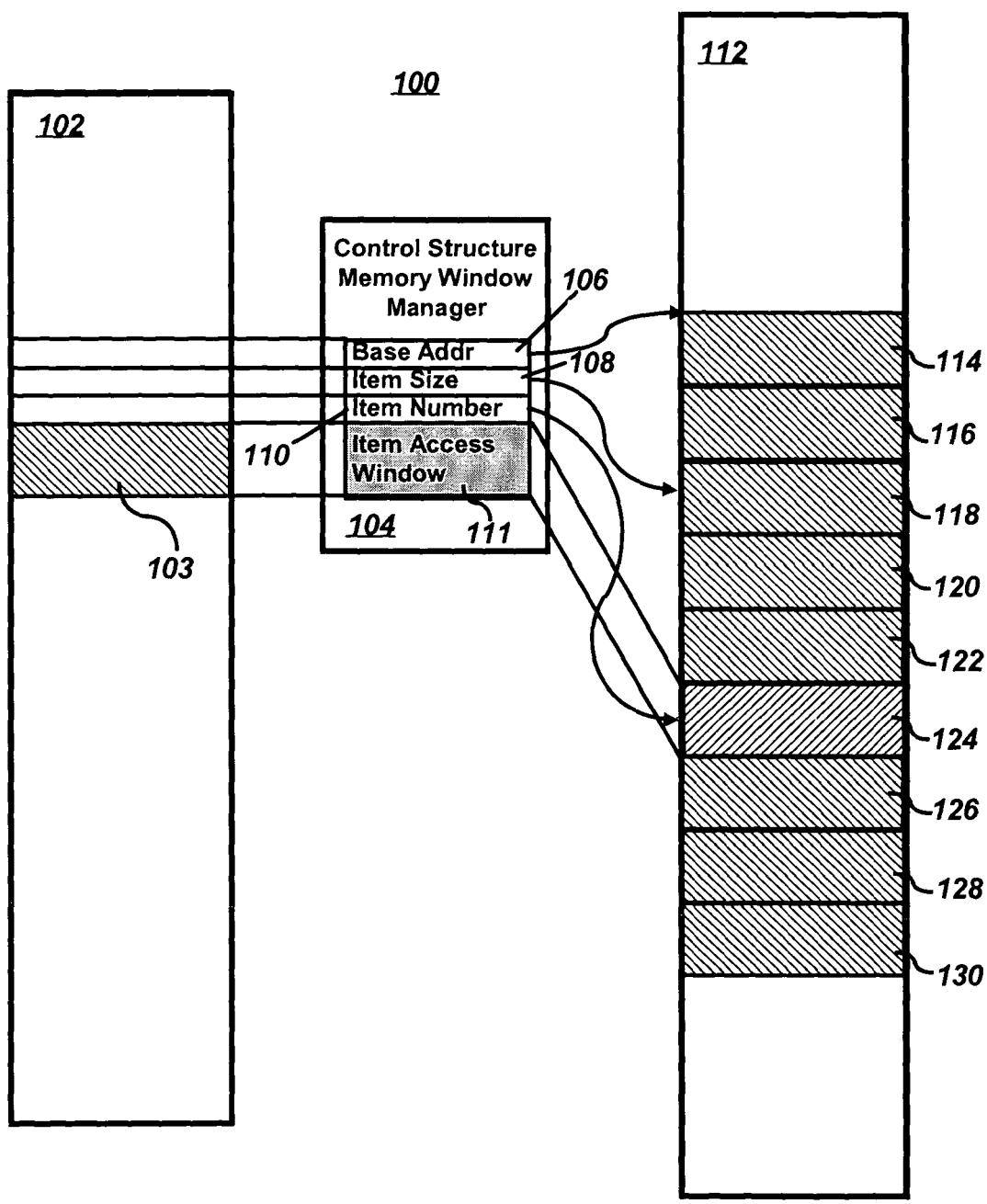
FIG. 1 illustrates a block diagram of a control structure memory window manager system, which can be implemented in accordance with an embodiment of the present invention.

With reference now to FIG. 1, a block diagram of a control structure memory window manager system 100 is illustrated, which can be implemented in accordance with an embodiment of the present invention. System 100 includes Memory Window Manager (MWM) 104, which permits system 100 to specify that exactly one control structure be mapped into a Central Processing Unit (CPU) address space 102 at any point in time. An example of an address space within CPU address space 102 is address space 103 indicated in FIG. 1. It is understood, of course, that although only one address space 103 is illustrated in FIG. 1 with respect to CPU address space 102, a multitude of other such address spaces may be present, depending upon particular embodiments thereof.

Figure 2:
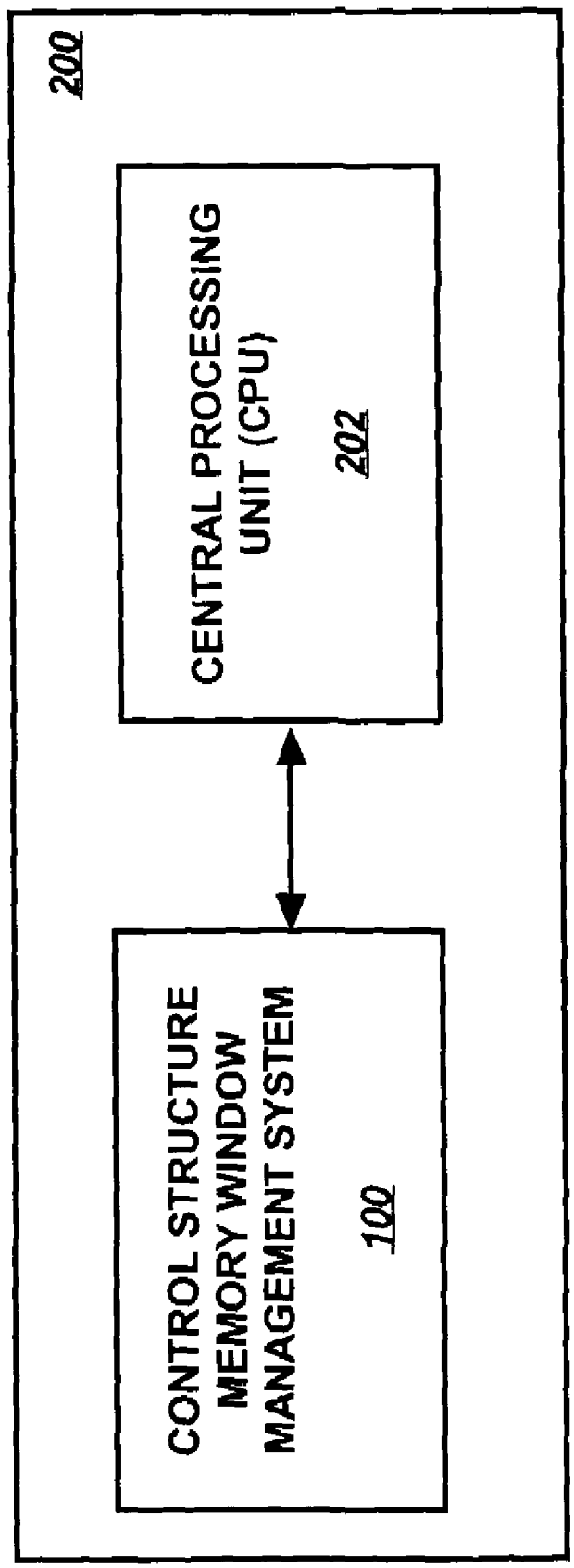
FIG. 2 illustrates a block diagram of the system depicted in FIG. 1 in association with a Central Processing Unit (CPU), which can be implemented in accordance with an embodiment of the present invention.

The basic structure of MWM 104 is thus illustrated in FIG. 1 with respect to system 100. Note in FIGS. 1 and 2, like or analogous parts are generally indicated by identical reference numerals. FIG. 2 illustrates a block diagram of the system 100 depicted in FIG. 1 in association with a Central Processing Unit (CPU) 202, which can be implemented in accordance with an embodiment of the present invention. A higher-level system 200 thus can include CPU 202 in association with system 100 of FIG. 1.

In general, MWM 104 allows CPU 202 to access one of a multitude of control structures, which can be physically stored in a memory system that is distinct from the primary memory of CPU 202. In fact, a memory 112 for control structure storage can actually be larger than any memory that the CPU 202 is capable of addressing directly. Note that the memory 112 can also be referred to as a CS-MEMORY (i.e., control structure storage memory). For example, the control structure memory 112 could be addressed using 64-bit addresses (i.e., via the MWM 104), even if the CPU 202 uses only 32-bit addresses for normal operations. In the example of FIG. 1, control structure memory 112 generally includes a plurality of memory regions 114 to 130.

The MWM 104 can be configured to include at least four different elements that can be mapped into the address space of CPU 202, presumably at a fixed or well-known location. The first element of MWM 104 allows the CPU 202 to program the base address, in the CS-MEMORY or memory 112, where the array of fixed-size control structures is located. This first element is labeled Base Addr 106 in FIG. 1. The value of the first element or Base Addr 106 value can typically be programmed at system initialization time, and will not be changed thereafter. The second element, referred to as Item Size 108 in FIG. 1, allows the CPU 202 of FIG. 2 to specify the size of each control structure. As will be explained later, this information allows the MWM 104 to compute the address, in CS-MEMORY (i.e., memory 112), of any desired control structure. The value of this second element, Item Size 108, will also be typically programmed at system initialization time, and is not altered thereafter.

The third element, referred to as Item Number 110, allows the CPU 202 of FIG. 2 to specify the index number of the control structure that the CPU wishes to access. The value of this third element, Item Number 110, will be changed frequently by the application, as it provides the mechanism for accessing any desired control structure at any point in time. The fourth element, referred to as Item Access Window 111, can be implemented as the memory window that allows the CPU 202 to access the control structure whose index number (e.g., presumed to be 0-based) is specified above. The CPU 202 can read or write to any location in this window, which will be reflected to the appropriate location in the memory 112. The MWM 104 can manage this redirection utilizing the values programmed into the three elements described above The core mechanism within the MWM 104 is an address computation engine. This mechanism operates by computing a CS-MEMORY address to be used to satisfy any CPU access to memory in the window. An illustrative example of such an address computation can be provided as follows. First, assume that the base address in CS-MEMORY (i.e., memory 112) of the control structures is B. Also, assume that the control structure size is S. Additionally, assume that the selected control structure's index value is I. Also, assume that the memory window for control structures begins at address W in the CPU's address space.

Next, assume that a memory access can be performed to address W+X in the CPU's address space, which resides within a region dedicated to the control structure access window 111. An example of such a region is region 124, which is depicted in FIG. 1. To satisfy this request, the MWM 104 simply computes a new address Z, and redirects the read or write request of CPU 202 to address Z in memory 112 (i.e., the CS-MEMORY). Z can then be computer according to equation (1) below:

$$Z=B+(I*S)+X \qquad (1)$$

Figure 3:
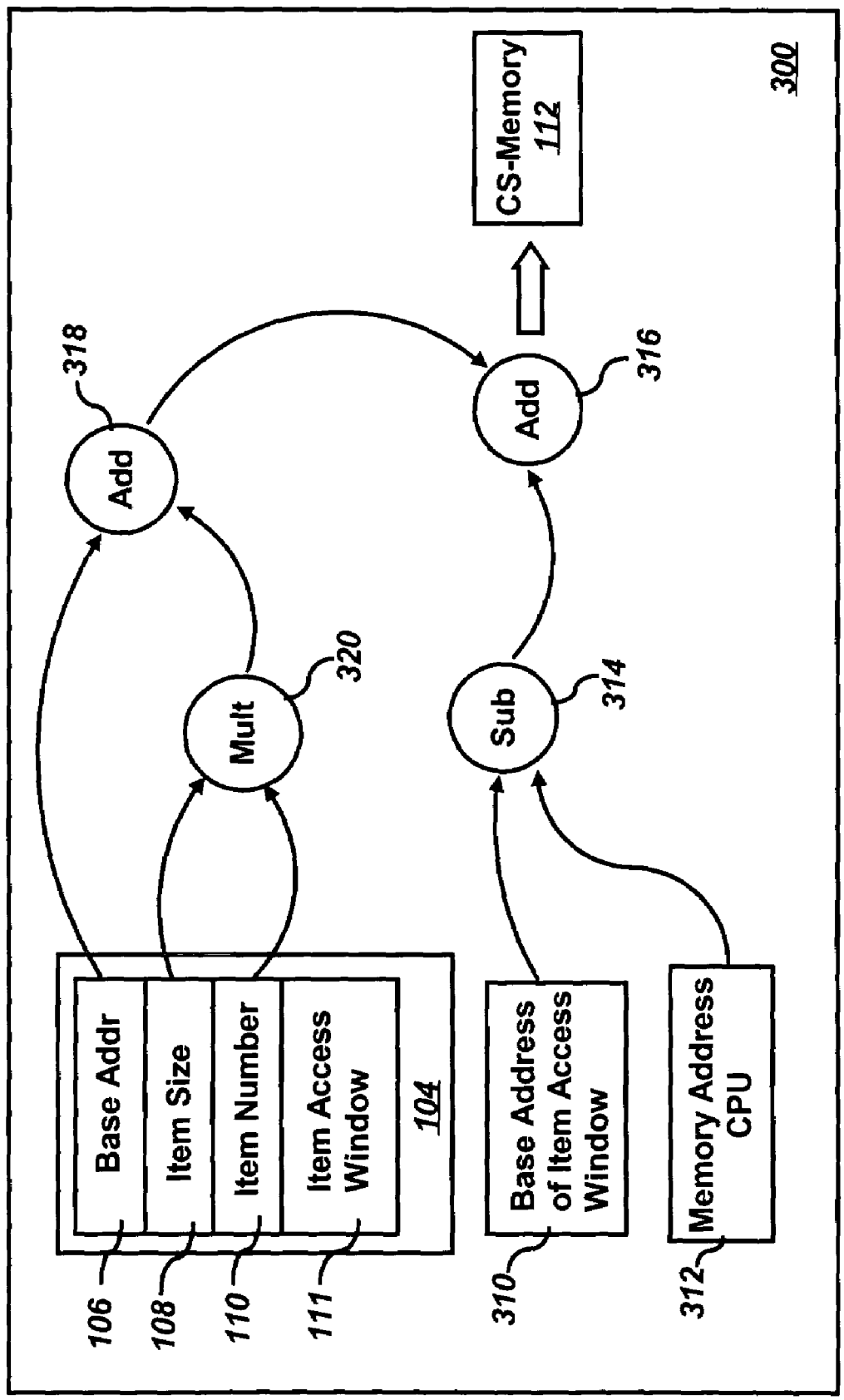
FIG. 3 illustrates a block diagram of an internal control structure, which can be implemented in accordance with an embodiment of the present invention.

FIG. 3 illustrates a block diagram of an internal control structure of an address computation engine 300, which can be implemented in accordance with an embodiment of the present invention. As indicated above, the key operational element of a MWM is an address computation engine. Such a mechanism is illustrated in further detail in FIG. 3 via address computation engine 300. Note that in FIGS. 1–3, like or analogous parts are indicated by identical reference numerals. Thus, in FIG. 3, Base Addr 106 and Item Size 108 values, as described above, are typically assigned values at system initialization time. The Item Number 110 value can be changed dynamically by the application, based on the control structure that it desires to access at any point in time. These three values can be fed through a multiplier 320 and adder 318 as indicated in FIG. 3, with the result being that the output of adder 318 can contain the base address, in CS-MEMORY (i.e., memory 112), of the desired control structure.

The lower part of FIG. 3 can then handles the computation of the actual CS-MEMORY address corresponding to the portion of the control structure that the program accesses in a given memory operation. As illustrated, a memory address 312 can be presented by the CPU to the MWM 104, and is presumed to be an address within the Item Access Window 111 in the CPU's address space. Various address decoding mechanisms can be utilized to determine if a CPU-generated address is, in fact, within the window 111. It can be appreciated, of course, that such address decoding mechanisms are not considered limiting features of the embodiments described herein.

In any event, the MWM 104 must determine the offset within the Item Access Window 111 of the CPU's memory address. This can be accomplished by subtracting via a subtractor 314, the base address 310 (within the CPU memory space) of the Item Access Window from the memory address that is presented by the CPU 202. The result of this subtraction can then be added to the value that was computed in the multiply/add step above utilizing an adder 316, thereby yielding an address that maps to the desired location within the control structure identified by the Item Number 110 field.

The mechanism shown via address computation engine 300 of FIG. 3 can utilize multipliers, adders, and subtractors, which are generally not the most efficient components for use in a high-speed address computation device. Such devices, however, can be easily replaced with much faster shifters, OR gates, AND gates, and other such logic circuitry, if the reasonable constraints are applied to the system. For example, the Base Addr value should preferably be a power of 2, and function as a multiple of overall size of the memory size required for the defined set of control structures (i.e. a multiple of Item Size*Number of Items). The Item Size value should also preferably be a power of 2. Additionally, the base address in the CPU memory of the Item Access Window should also preferably be a multiple of the Item Size value.

If these constraints are applied, then various component simplifications can be utilized. For example, the adders 318 and 316 can be replaced with OR-gates, or with simple concatenation of the bits in the base value with the bits in the secondary addend. The subtractor 314 can be replaced with AND-gates, or with simple "bit extraction" mechanisms. The multiplier 320 can be replaced with a shifter, or with simple "bit rerouting" mechanisms.

It is clearly possible for multiple MWMs to be implemented within a given system. This would allow for several different types of control structures to be managed by a given application. Each MWM would have its base address field programmed to allow for non-overlapping storage in CS-MEMORY of the various different sets of control structures.

One advantage of the embodiments described herein is that they permit an application to manage more control structures (and presumably more resources) than will actually fit within the CPU's address space at any point in time. An example of such an application is a RAID controller's firmware implementation. A RAID controller typically has to manage a very large memory-resident cache for recently-accessed data blocks.

This cache memory generally does not need to be accessed directly by the CPU, but rather only by I/O channel processors that transfer the data between host systems and back-end disk drives. Consequently, the cache memory can usually be implemented as a totally independent memory system. The CPU memory, however, generally should be utilized to hold control structures that track each block of cache memory.

Such control structures must be accessed frequently by the CPU, and that is the motivation for placing them in the CPU's address space. As size of the cache memory increases, however, it becomes correspondingly difficult to fit all of the required control structures in CPU memory due to address space constraints. The embodiments described herein can therefore allow for a separate memory system (possibly even the same memory system that holds the cache blocks) to be utilized to maintain the control structures. The MWM then can provide the RAID application with the ability to select any desired control structure for mapping into the CPU address space. Consequently, program access to the control structure is made possible.

Note that embodiments can be implemented in the context of modules. In the computer programming arts, a module can be typically implemented as a collection of routines and data structures that performs particular tasks or implements a particular abstract data type. Modules generally are composed of two parts. First, a software module may list the constants, data types, variable, routines and the like that can be accessed by other modules or routines. Second, a software module can be configured as an implementation, which can be private (i.e., accessible perhaps only to the module), and that contains the source code that actually implements the routines or subroutines upon which the module is based.

Thus, for example, the term module, as utilized herein generally refers to software modules or implementations thereof. Such modules can be utilized separately or together to form a program product that can be implemented through signal-bearing media, including transmission media and recordable media. MWM 104 can be implemented as a module or group of such modules.

MWM 104 can comprise, for example, a memory window manager module, which communicates with a CPU and a plurality of control structures, such that the memory window manager module specifies which control structure among the plurality of control structures is accessible by the CPU. Such a memory window manager module can further specify which control structure among the plurality of control structures can be mapped into an address space of the CPU.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method for managing control structure access, said method comprising
    configuring a memory window manager to communicate with a processor and a plurality of control structures, wherein data is communicable between said processor and said plurality of control structures, wherein a fixed size is the size of every one of said plurality of control structures, and wherein said memory window manager comprises a control structure index value; and
    using the control structure index value to specify which control structure among said plurality of control structures is mapped into an address space of said processor.

2. The method of claim 1 wherein said memory manager further comprises an element which permits said processor to program a base address in a memory for control structure storage.

3. The method of claim 1 wherein said memory manager further comprises an element that allows said processor to specify a size for each control structure among said plurality of control structures.

4. The method of claim 1 wherein said memory manager further comprises a memory window that permits said processor to access a control structure among said plurality of control structures based on a index number associated with said control structure.

5. The method of claim 1 wherein said processor comprises a Central Processing Unit (CPU) of a computer.

6. The method of claim 1 further comprising:
    configuring said memory window manager to comprise an address computation engine.

7. A system for managing control structure access, said system comprising
    a processor which communicates with a plurality of control structures wherein a fixed size is the size of every one of said plurality of control structures;
    a memory window manager comprising a control structure index value and wherein said memory window manager communicates with said processor and said plurality of control structures, wherein said memory window manager uses said control structure index value to specify which control structure among said plurality of control structures is mapped into an address space of said processor.

8. The system of claim 7 wherein said memory window manager further comprises an element which permits said processor to program a base address in a memory for control structure storage.

9. The system of claim 7 wherein said memory window manager further comprises an element that allows said processor to specify a size for each control structure among said plurality of control structures.

10. The system of claim 7 wherein said processor comprises a Central Processing Unit (CPU) of a computer.

11. The system of claim 7 wherein said memory window manager comprises:
    a memory window manager module located in a memory location of a computer, wherein said memory window manager module communicates with said processor and said plurality of control structures, wherein said memory window manager module specifies which control structure among said plurality of control structures is accessible by said processor.

12. The system of claim 7 wherein said memory window manager comprises an address computation engine.

13. A system for managing control structure access by a Central Processing Unite (CPU), said system comprising
    a CPU of a computer, wherein said CPU communicates with a plurality of control structures;
    a memory window manager module comprising a base address element, a size element, and index element, and a memory window wherein said memory window manager communicates with said CPU and said plurality of control structures, wherein every one of said plurality of control structures has a size equaling that specified by the size element, wherein said memory window manager module uses said index element to specify which control structure among said plurality of control structures is mapped to said memory window and wherein said memory window is mapped into an address space of said CPU.

* * * * *